United States Patent
Sharp

[15] 3,661,428
[45] May 9, 1972

[54] ELECTRICAL CIRCUIT ARRANGEMENTS FOR CONVERTING A VARIABLE RATE OF PULSE TRANSMISSION INTO A RELATED ELECTRICAL OUTPUT QUANTITY

[72] Inventor: Denis Sharp, Crawley, Sussex, England
[73] Assignee: U.S. Philips Corporation, New York, N.Y.
[22] Filed: Sept. 16, 1969
[21] Appl. No.: 858,420

[30] Foreign Application Priority Data
Sept. 18, 1968 Great Britain..................44,276/68

[52] U.S. Cl. ...............303/21 CF, 188/181 A, 303/21 CG, 307/233, 307/295, 320/1
[51] Int. Cl. ..............................B60t 8/08, B60t 8/12
[58] Field of Search..........188/181, 181 A, 181 C; 303/21, 303/20; 320/1; 307/233, 295; 324/160, 161, 162; 328/140

[56] References Cited

UNITED STATES PATENTS

| | | | |
|---|---|---|---|
| 3,060,602 | 10/1962 | Buttenhoff | 303/21 BE UX |
| 3,245,727 | 4/1966 | Anderson et al. | 303/21 EB |
| 3,263,096 | 7/1966 | Willard | 307/233 X |
| 3,511,542 | 5/1970 | Fielek, Jr. | 303/21 EB |
| 3,519,313 | 7/1970 | French et al. | 303/21 BE |
| 3,245,213 | 4/1966 | Thompson et al. | 303/21 |
| 3,482,887 | 12/1969 | Sheppard | 303/21 B |

OTHER PUBLICATIONS

May et al., British Patent Specification, Ser. No. 880,767, filed 2-17-59

Primary Examiner—Milton Buchler
Assistant Examiner—Stephen G. Kunin
Attorney—Frank R. Trifari

[57] ABSTRACT

An anti-lock vehicle brake control system comprising a wheel sensor for generating a train of pulses at a frequency proportional to the wheel speed. A switching transistor receives the pulses. A first capacitor is coupled to the output of the switching transistor via a first isolation diode. The switching transistor causes the first capacitor to charge up to a predetermined voltage level for each pulse received. A discharge circuit allows the first capacitor to discharge in the interval between successive pulses. A second capacitor is permanently connected to a source of charging current and is also coupled to the first capacitor via a second isolation diode so that the second capacitor will discharge towards the voltage level on the first capacitor to produce a voltage on the second capacitor that is proportional to wheel speed. The latter voltage is used to actuate a control valve in the vehicle brake fluid pressure system to relieve the braking pressure whenever said capacitor voltage exceeds a given value.

7 Claims, 5 Drawing Figures

INVENTOR.
DENIS SHARP
BY
AGENT

PATENTED MAY 9 1972

INVENTOR.
DENIS SHARP
BY
Frank R. Trifari
AGENT

PATENTED MAY 9 1972

INVENTOR.
DENIS SHARP
BY
AGENT 3,661,428

ELECTRICAL CIRCUIT ARRANGEMENTS FOR CONVERTING A VARIABLE RATE OF PULSE TRANSMISSION INTO A RELATED ELECTRICAL OUTPUT QUANTITY

This invention relates to electrical circuit arrangements for converting a variable rate of pulse transmission into a related electrical output quantity, and more specifically to such circuit arrangements of a kind having a first capacitor arranged to be charged in response to each pulse of a train of pulses applied to the arrangement, the charge on this first capacitor decaying between successive pulses, and a second capacitor arranged to assume a level of charge in accordance with the level of the charge on the first capacitor, said output quantity being derived from the second capacitor. A circuit arrangement of this kind is disclosed in U.S. Pat. No. 3,508,074 Specification No. 1,143,092 (PHB 31561).

According to the present invention an electrical circuit arrangement of the above kind comprises, transistor switching means responsive to each pulse of a train capacitor to be charged to a predetermined level through a first isolating diode, the charge on said first capacitor then decaying until the beginning of the next pulse, a charging circuit in which said second capacitor is permanently connected, and a second isolating diode through which the charge on said second capacitor can decay to or towards the level of the charge on said first capacitor. The output quantity is derived from said second capacitor in accordance with the level of charge thereon.

In the operation of an electrical circuit arrangement according to the invention, the frequency at which the first capacitor is repetitively charged to said predetermined level corresponds to the instantaneous frequency of the applied train of pulses so that the level of charge remaining on the first capacitor immediately before it is recharged to said predetermined level on the occurance of each pulse increases with an increase in the pulse frequency, and vice-versa.

The second capacitor is continually attempting to charge up over its permanent charging circuit, but its charge is also decaying through the second isolating diode to or towards the level of the charge remaining on the first capacitor, so that the resultant level of the charge on the second capacitor is determined by the level of the charge to which the first capacitor is decaying, which level, as aforesaid, is determined by the pulse frequency. The output quantity produced by the arrangement is preferably the voltage existing across the second capacitor as determined by the level of charge thereon.

It is envisaged that an electrical circuit arrangement according to the invention has a particular application in so-called anti-lock brake systems for wheeled vehicles, that is, systems designed to improve braking performance of a vehicle by relieving the braking pressure applied to a wheel if the wheel tends to lock on a slippery surface following brake application and then increasing the braking pressure again without the need for any change in the actual braking action causing the brake application. Such systems can be successful in reducing the risk of skidding due to wheel lock and in maintaining directional control and can also reduce braking distances.

This envisaged application of the electrical circuit arrangement is in control circuit means of an anti-lock vehicle brake system of the character comprising, for use in combination with a vehicle wheel and associated wheel brake, a wheel sensor for producing electrical signals related to rotational movement of the wheel, control circuit means which is responsive to said electrical signals to produce an electrical output in dependence on a particular criterion related to wheel rotational movement, and control valve means which is arranged for actuation in response to said electrical output to cause braking pressure as applied from a fluid pressure source of the system to the wheel brake to be relieved. A suitable criterion — though not the only one — is when the deceleration of the wheel is in excess of a predetermined value.

In this application, the electrical circuit arrangement can provide a voltage of value related to the frequency of a pulse train (constituting said electrical signals) which is generated in response to wheel rotational movement, the frequency of the pulse train being related to wheel speed. Typically, the pulse train may be produced by magnetic interaction between a ferromagnetic toothed ring attached to the wheel and an electromagnetic pick-up which is positioned adjacent to the ring to sense the change of flux as each tooth of the ring passes it and is succeeded by a gap when the wheel revolves, said ring and pick-up constituting the wheel sensor. The resulting voltage output, which is related to the frequency of the pulse train, can be utilised in the control circuit means to determine when the electrical output is to be produced to cause the actuation of the control valve means. The latter is suitably a solenoid or other electro-magnetic device responsive to said electrical output to produce mechanical movement for actuating an associated valve.

The present invention also provides an anti-lock vehicle brake system of the above character having control circuit means embodying an electrical circuit arrangement as set forth above.

In order that the invention may be more fully understood reference will now be made by way of example to the accompanying drawings, in which:

FIG. 3 is a block diagram of a control circuit means of an anti-lock vehicle brake system of the character referred to;

FIG. 5 is a block diagram of an anti-lock vehicle brake system of the character referred to.

Figure 1:
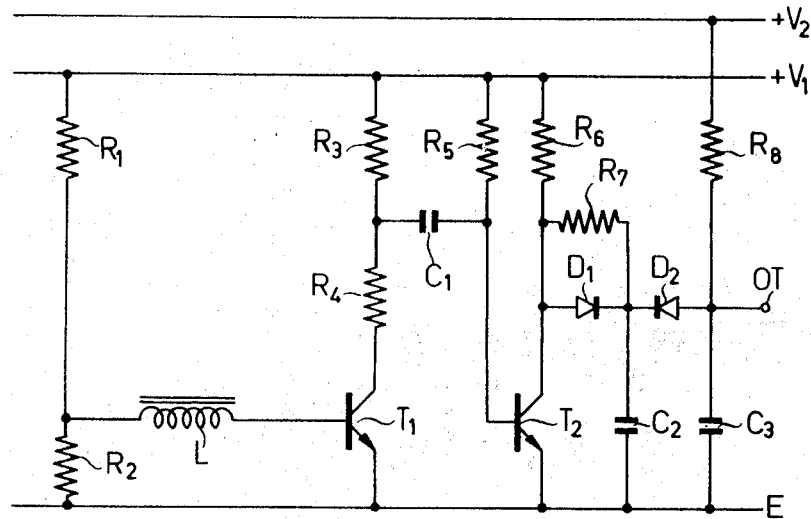
FIGS. 1 and 2 show respective embodiments of an electrical circuit arrangement conforming to the invention.

Referring to the drawings, the electrical circuit arrangement shown in FIG. 1 comprises an input transistor T1 having its base connected to one end of an output coil L of a pick-up device (not otherwise shown) which is arranged to produce a train of pulses for application to the base of transistor T1. The other end of the coil L is connected to the junction of two resistors R1 and R2 which are connected in series between an earth line E and a positive voltage line + V1.

The collector of the transistor T1 is connected to the positive voltage line + V1 via two series connected resistors R3 and R4 and its emitter is connected directly to the earth line E. A switching transistor T2 has its base connected on the one hand to the junction of the resistors R3 and R4 via a capacitor C1 and on the other hand to the positive voltage line + V1 via a resistor R5. The emitter of the transistor T2 is connected directly to the earth line E and its collector is connected to the positive voltage line + V1 via a resistor R6. There is connected to the collector of transistor T2 one end of the parallel combination of a resistor R7 and a diode D1. The other end of this parallel combination is connected to one side of a capacitor C2, the other side of which is connected to the earth line E. A capacitor C3 is connected in series with a resistor R8 between the earth line E and a positive voltage line + V2. The junction of this capacitor C3 and resistor R8 has an output terminal OT connected to it, and this junction is also connected via a diode D2 to the common junction of resistor R7, diode D1 and capacitor C2.

When the electrical circuit arrangement of FIG. 1 is energized by the application of suitable supply voltages across the earth line E and the positive voltage lines + V1 and + V2, the switching transistor T2 is rendered conductive, while the input transistor T1 is initially biased at the threshold of conduction. Upon the application of a train of pulses from the pick-up device output coil L to the base of transistor T1, this transistor is rendered conductive in response to each pulse of the train to effect amplification and limiting at the pulse train frequency. The resulting output at the collector of transistor T1 is a square wave voltage which is applied to the capacitor C1. The capacitor C1, in conjunction with resistor R5 differentiates each cycle of this square wave voltage. Thus, there is applied to the base of the switching transistor T2 negative-going voltage spikes which render this latter transistor non-conductive for a short period once per cycle of this square wave voltage. Each time transistor T2 is cut-off diode D1 becomes forward biased to complete a charging circuit for the capacitor C2 through this diode and resistor R6 to the positive voltage line + V1, so that the voltage across capacitor C2 is effectively reset to the voltage of the positive voltage line + V1. During the remainder of each cycle of the square wave voltage the charge on the capacitor C2 is decaying through resistor R7 and transistor T2 which is now conductive again, so that the voltage across the capacitor C2 decreases. The extent of this decrease depends upon the time interval between successive negative-going voltage spikes applied to the base of transistor T2 and thus upon the instantaneous frequency of the applied train of pulses.

Since the capacitor C3 is permanently connected in series with resistor R8 between the earth line E and the positive voltage line + V2, this capacitor will immediately begin to charge up as soon as the circuit arrangement is energized by the application of suitable supply voltages. However, as soon as the voltage across the capacitor C3 exceeds the voltage across the capacitor C2, the diode D2 becomes forward biased so that the charge on capacitor C3 decays through diode D2 to or towards the level of the charge on the capacitor C2. Therefore, the value of the voltage across the capacitor C3 tends to follow the value of the voltage across the capacitor C2 as the charge on the latter is decaying and the value to which the voltage across capacitor C2 has decayed is stored on the capacitor C3 each time the voltage across the capacitor is reset at the beginning of each applied pulse. If the frequency of the applied train of pulses increases, then the voltage across capacitor C3 increases to a higher value which the voltage across capacitor C2 only has time to decay to, before resetting, because of the shorter time interval between successive pulses. Conversely, if the frequency of the applied train of pulses decreases, then the voltage across capacitor C2 decreases to a lower value because there is a longer time interval before this voltage is reset and the voltage across capacitor C3 is pulled down to this lower level. The voltage across capacitor C3 is the output voltage appearing at the output terminal OT of the arrangement.

Figure 2:
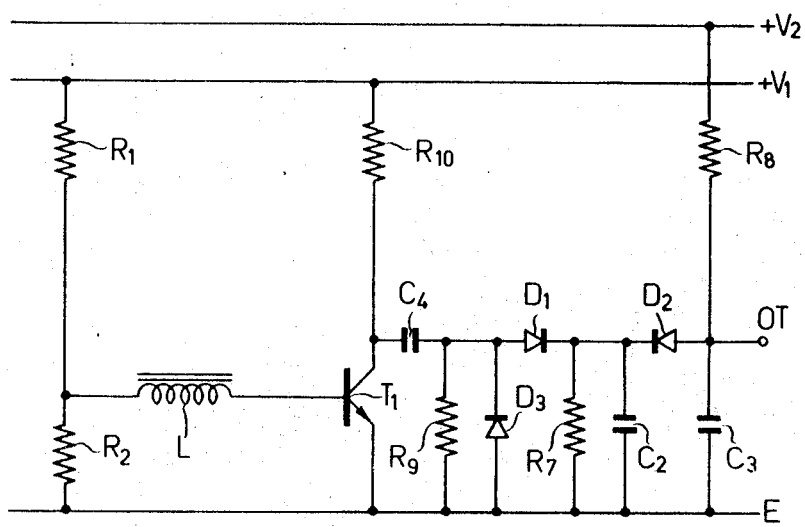

The electrical circuit arrangement shown in FIG. 2 is similar in many respects to the arrangement of FIG. 1 and, for the sake of convenience, corresponding components in these two arrangements have been given the same references. The main difference between the two arrangements is that in FIG. 2 there is now only a single transistor T1. This transistor T1 is biased so that it undergoes a change of conductive state in response to each pulse of a train of pulses applied to the arrangement. Each time the transistor T1 changes its conductive state a voltage pulse appears at its collector and this pulse is differentiated by capacitor C4 and resistor R9 to provide a positive going voltage spike, either at its leading edge or its trailing edge depending on its polarity which is applied through diode D1 to charge the capacitor C2. In this way the voltage across the capacitor C2 is effectively reset to the voltage of the positive voltage line + V1, as in the arrangement of FIG. 1. The charge on the capacitor C2 thereafter commences to decay through resistor R7 until the voltage across capacitor C2 is reset again and the operation of the circuit arrangement is now in other respects as described for the arrangement of FIG. 1. The diode D3 in the arrangement of FIG. 2 serves to divert to the earth line E the negative-going voltage spike arising from each differentiation. Without this diode D3, the capacitor C4 would tend to the charge which it acquired due to this negative going voltage spike.

Preferably, in each of the electrical circuit arrangements of FIGS. 1 and 2, the voltage of the positive voltage line +V1 is stabilized to ensure accurate resetting of the voltage across the capacitor C2. This stabilized voltage may be provided, for example, by means of a Zener diode as shown in the circuit diagram of FIG. 4.

Figure 3:
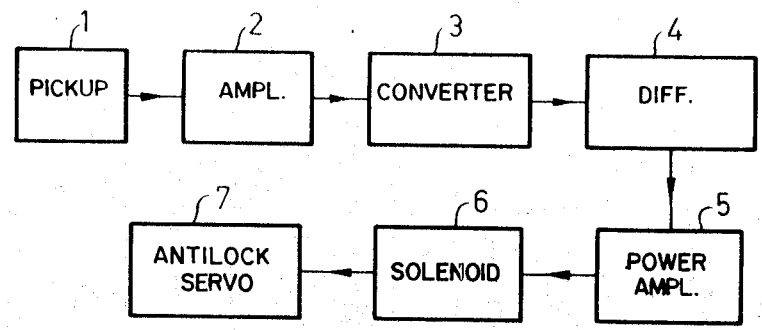

Suitable types and values for the components of the electrical circuit arrangements of FIGS. 1 and 2 are as follows:

Transistor TR1—type Bc 108 Mullard Resistor R1—3K ohms
Transistor TR2—type Bc 108 Mullard Resistor R2—270 ohms
Capacitor C1—0.022μF Mullard Resistor R3—10K ohms
Capacitor C2—0.1μF Mullard Resistor R4—10K ohms
Capacitor C3—1.0μF Mullard Resistor R5—56K ohms
Capacitor C4—1.0μF Mullard Resistor R6—1K ohms
Diode D1—type OA202 Mullard Resistor R7—15K ohms
Diode D2—type OA202 Mullard Resistor R8—270K ohms
Diode D3—type OA202 Mullard Resistor R9—1K ohms
Resistor R10—330 ohms
Voltage + V1—+9.1 volts (stabilized)
Voltage + V2—+12 volts Turning now to FIG. 3, the control circuit means represented by the block diagram there shown is responsive to pulses related to rotational movement of a vehicle wheel. As aforesaid, these pulses may be produced by an electro-magnetic pick-up 1 which is associated with a ferro-magnetic toothed ring attached to the wheel to sense the change of flux as each tooth of the ring passes it and is succeeded by a gap as the wheel revolves. The pulse output from the pick-up 1 is amplified by an amplifier 2 and then applied to a frequency-to-D.C. convertor 3 which would be comprised by an electrical circuit arrangement conforming to the invention and is effective to produce an output voltage of magnitude related to the frequency of the pulses supplied by the pick-up 1. This output voltage is differentiated by a differentiator 4, the output from which is passed to a power amplifier 5, and the output from the power amplifier 5 is utilized to operate a solenoid 6 adapted to actuate control valve means (antilock servo 7).

In the circuit diagram of the control circuit means shown in FIG. 4, the pick-up is again represented only by its output coil L as in FIGS. 1 and 2. The pulse output from this pick-up output coil L is coupled into the base of a transistor Ta, which comprises the amplifier 2 in FIG. 3, via a capacitor Ca. A capacitor Cb serves to remove unwanted interference in the output from the output coil L, and a diode Da serves to prevent the D.C. bias at the base of transistor Ta, as provided by a resistor Ra connected between the base and collector of this transistor, from shifting due to the rectification of the pulse input to the base by the base/emitter diode of the transistor Ta.

The output produced at the collector of transistor Ta is a square wave voltage which is coupled into the base of a transistor Tb via a capacitor Cc. This capacitor Cc and a base resistor Rb for transistor Tb have values chosen such that the transistor Tb, being normally conductive, is rendered non-conductive to produce a positive pulse of fixed length at its collector for each cycle of square wave voltage coupled into its base. Each such positive pulse charges up a capacitor Cd through a diode Db to the stabilized voltage on the line SL. This stabilized voltage is provided by a Zener diode Zd which is connected in series with a resistor Rc across the voltage supply lines + V and OV. At the termination of each positive pulse at the collector of transistor Tb, capacitor Cd commences to discharge exponentially through a resistor Rd and transistor Tb. When the voltage across the capacitor Cd becomes negative with respect to the voltage across a capacitor Ce, a diode Dc becomes forward biased so that capacitor Ce also commences to discharge through the diode Dc, but at a much lower rate because its discharge time constant is much longer than the discharging time constant of capacitor Cd. However, each time capacitor Cd is being re-charged, diode Dc is back biased, thus allowing capacitor Ce to charge up via a resistor Re with which it is connected in series across the voltage supply lines +V and OV. The components Tb, Db, Rd, Dc, Cd, Ce and Re essentially comprise an electrical circuit arrangement conforming to the invention and forming the frequency-to-D.C. convertor 3 of FIG. 3. This arrangement produces across capacitor Ce an output voltage whose value is related to the input frequency of the pulse output supplied by the pick-up, and may thus be termed a speed signal as it is directly related to wheel speed. This output voltage (speed signal) across capacitor Ce is coupled to the base of a normally conductive transistor Tc via a capacitor Cf and a resistor Rf. The value of this capacitor Cf and the value of a resistor Rg to which the capacitor is also coupled, determine a selected wheel deceleration at which transistor Tc and a further normally conductive transistor Td are rendered non-conductive in response to the value of speed signal then obtaining, to cause a normally non-conductive transistor Te to become conductive. The components Cf, Tc and Td essentially comprise the differentiator 4 of FIG. 3. The resistor Rg, which together with resistor Rf forms a potential divider in the base circuit of transistor Tc, provides a current sufficient to drive the base of transistor Tc with about 10 times the current needed to maintain the two transistors Tc and Td normally conductive. Thus the selected wheel deceleration at which transistor Te becomes conductive is virtually independent of the gains of the transistors Tc and Td. A resistor Rh in the collector circuit of transistor Tc serves to limit the base current of transistor Td, and a capacitor Cg and the resistor Rf in the base circuit of transistor Tc makes the circuit insensitive to ripple in the speed signal. A diode Dd serves to stabilize the base current of the transistor Tc against temperature changes. A capacitor Ch serves to prevent spurious oscillation at high frequencies since the transistors are capable of working up to 80 M/cs.

The transistor Tf and a further transistor Tg amplify the output from transistor Te. These transistors Te, Tf and Tg form the power amplifier 5 of FIG. 3. The output from transistor Tg drives a solenoid S which corresponds to the solenoid 6 in FIG. 3. A diode De serves to clip overshoot voltage on the solenoid S when it is switched off, thereby preventing too high a voltage from being applied to the collector of transistor Tg.

The circuit parameters would be so chosen that the solenoid would be turned off when the wheel being sensed has accelerated up to the speed it would have been doing if it had continued to decelerate from its initial speed, at the instant of braking, at a rate equal to the selected wheel deceleration at which the solenoid was turned on.

It is also arranged that the solenoid S is turned off after a predetermined period, even if the wheel does not re-accelerate after the solenoid S has been turned on. This is achieved by means of capacitor Cf which in conjunction with resistor Rg serves as an A.C. coupling to differentiate the speed signal, so that after a certain period of energization of the solenoid, as determined by the time constant of this A.C. coupling, the transistors Tc and Td are rendered conductive again to render transistor Tg non-conductive to de-energize the solenoid. However, since the capacitor Cf and resistor Rg also determine the selected wheel deceleration, the time constant of the A.C. coupling afforded by these components cannot be varied, to vary the period before the solenoid is de-energized in the absence of wheel re-acceleration, without also varying the selected wheel deceleration. A separate A.C. coupling which is independant of capacitor Cf and resistor Rg suitably comprises a further capacitor connected in the base circuit of transistor Te, together with a further resistor connected between this base and the OV line.

Figure 4:
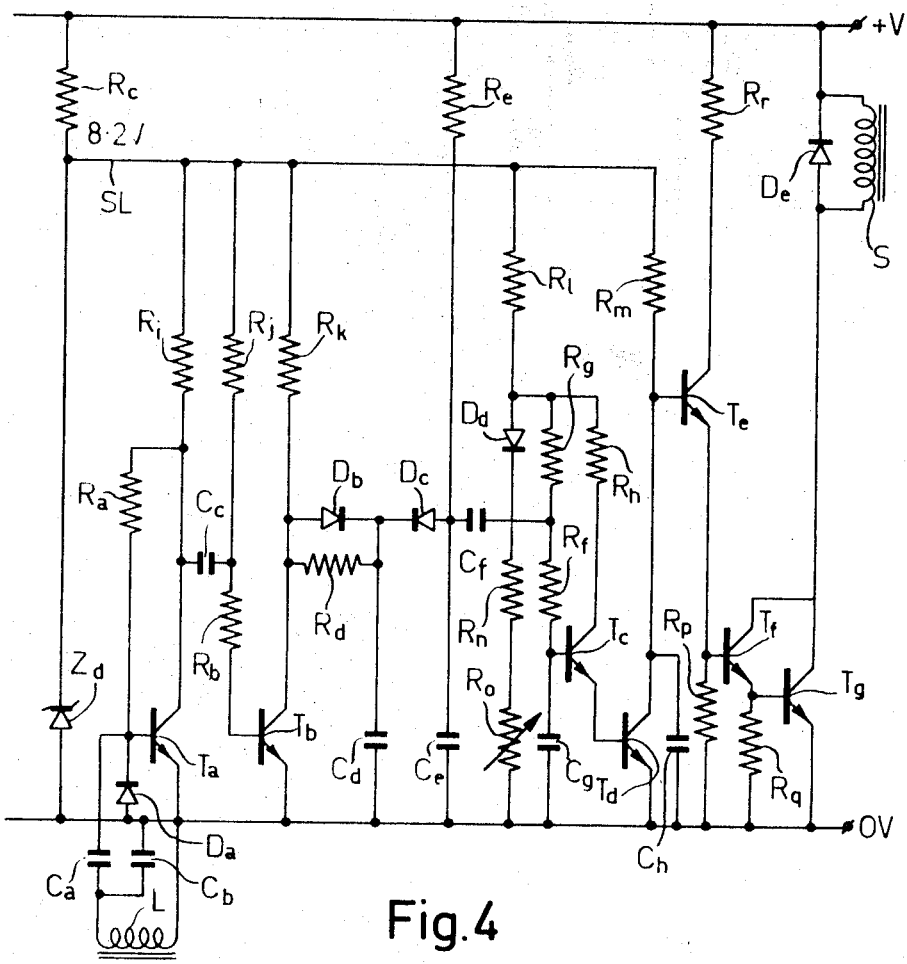
FIG. 4 is a circuit diagram of the control circuit means of FIG. 3.

The circuit diagram of FIG. 4 may be modified in that if a capacitor Cf of larger value and higher gain transistors are used, the transistor Tc and its collector resistor Rh can be dispensed with and the junction of resistor Rf and capacitor Cg can then be connected directly to the base of transistor Td.

Also, in each of the circuits of FIGS. 1, 2 and 4 transistors of opposite type to those shown may be used with suitable adjustment of the voltage supply lines.

Suitable components and component values for the circuit diagram of FIG. 4 are as follows:

Resistors
Ra—1M ohms
Rb—3K ohms
Rc—150 ohms
Rd—15K ohms
Re—150K ohms
Rf—33K ohms
Rg—470K ohms
Rh—470K ohms
Ri—18K ohms Rj—56K ohms
Rk—1K ohms
Rl—10K ohms
Rm—33K ohms
Rn—4K ohms
Ro—10K ohms
Rp—10K ohms
Rq—1K ohms
Rr—150 ohms Capacitors
Ca—.22μF
Cb—0.1μF
Cc—.022μF
Cd—0.1μF
Ce—1.0μF
Cf—1.0μF
Cg—0.1μF
Ch—2kpF Transistors
Ta—type BC 108 (Mullard)
Tb    "         "
Tc    "         "
Td    "         "
Te    "         "
Tf—BFY52        "
Tg—BDY10        "

Diodes
Zd—8.2v zener (Mullard)
Da—type OA202    "
Db—   "          "
Dc—   "          "
Dc—   "          "
Dd—   "          "
De—BYZ10         "

Voltages
+V=12 volts

Figure 5:
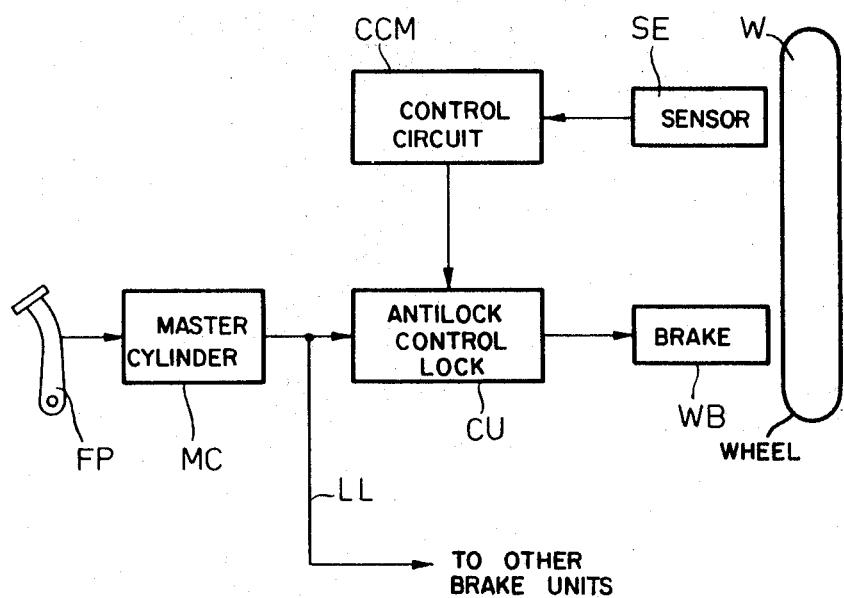

FIG. 5 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel sensor SE applies electrical pulses related to wheel rotational movement to a control circuit means CCM. The anti-lock control unit CU would include control valve means which is arranged for actuation in response to an electrical output from the control circuit means CCM to cause braking pressure applied to the wheel brake WB to be relieved. This system is of the character previously referred to, and in the present instance in which the control circuit means is in accordance with FIGS. 3 and 4, the electrical output would be produced from the control circuit means CCM when the deceleration of the wheel is in excess of a predetermined value. The wheel sensor WE would be the pick-up 1 and the solenoid 6 and anti-lock servo 7 (i.e. the control valve means) would be included in the anti-lock control unit CU.

As indicated by the lead LL, separate systems as shown in FIG. 5 (with a common fluid pressure source) may be provided in respect of each road wheel of a vehicle, but it would also be possible to provide a single system for two (rear) wheels driven by a vehicle propellor shaft with a sensor associated with the shaft for producing the electrical signals related to wheel rotational movement. As an alternative, a single anti-lock control unit including control valve means may be provided in common for all the road wheels of a vehicle. In this case each road wheel would have its own wheel sensor and associated control circuit means and any of the latter would provide an electrical output to actuate the control valve means when the appertaining wheel tends towards a locked condition.

We claim:

1. An anti-lock vehicle brake control system comprising, a source of fluid pressure to control the braking force on a vehicle wheel, a wheel sensor for producing a train of pulses at a frequency that is related to the vehicle wheel speed, transistor switching means coupled to said wheel sensor to receive said pulse train, a first isolating diode, a first capacitor coupled to said transistor switching means via said first diode, said transistor switching means being responsive to the pulses in said pulse train to cause said first capacitor to be charged to a predetermined voltage level via said first diode, circuit means for discharging said first capacitor during the period between successive pulses in the pulse train, a second capacitor, a charge circuit including a source of voltage permanently connected to said second capacitor, a second isolating diode coupling said first and second capacitors together so that the charge on the second capacitor can decay towards the level of charge on the first capacitor to produce a voltage on the second capacitor that is determined by the wheel speed, and control valve means actuated in response to a given voltage level on said second capacitor to relieve the fluid pressure applied to the vehicle brakes.

2. A brake control system as claimed in claim 1 wherein said transistor switching means comprises, an input transistor coupled to the wheel sensor, means for biasing said input transistor at its threshold of conduction so that each pulse received turns the transistor on thereby producing at its output electrode a square wave voltage at the pulse frequency, a differentiating circuit coupled to said transistor output electrode for differentiating each cycle of said square wave voltage, a switching transistor which is normally biased into conduction, and means coupling the output electrode of the switching transistor to the first diode and the input of said switching transistor to the output of the differentiating circuit so that the switching transistor is cut-off in response to the leading voltage spike produced therein during each cycle of the square wave voltage.

3. A brake control system as claimed in claim 2 wherein said switching transistor output electrode is the collector electrode, means connecting said first diode and said first capacitor in series to said collector electrode, a resistor connected in shunt with the first diode, a second resistor connecting said collector to a source of DC voltage, said first capacitor being charged via said second resistor and said first diode when said switching transistor is cut-off.

4. A brake control system as claimed in claim 3 wherein said circuit means for discharging the first capacitor comprises said shunt resistor and the emitter-collector path of the switching transistor.

5. A brake control system as claimed in claim 2 wherein said first and second diodes are series connected with opposite polarity between the switching transistor output electrode and the second capacitor.

6. A brake control system as claimed in claim 1 wherein said transistor switching means comprises, an input transistor coupled to the wheel sensor, means for biasing said input transistor at its threshold of conduction so that the transistor undergoes a change of its conductive state in response to each pulse received, a differentiating circuit coupled to said transistor output electrode for differentiating the output pulses appearing thereat to produce positive going and negative going voltage spikes, the voltage spikes of one polarity being applied through said first diode to charge said first capacitor, and a resistor connected in shunt with said first capacitor to provide a discharge path therefor.

7. A brake control system as claimed in claim 6 further comprising a third diode connected between the output of the differentiating circuit and ground and poled so as to bypass to ground the voltage spikes of the other polarity.

* * * * *

PO-1050
(5/69)

UNITED STATES PATENT OFFICE
CERTIFICATE OF CORRECTION

Patent No. 3,661,428     Dated May 9, 1972

Inventor(s) Denis Sharp

It is certified that error appears in the above-identified patent and that said Letters Patent are hereby corrected as shown below:

col. 1, line 20, after "train" insert -- of pulses applied to the arrangement to cause said first --;

Col. 1, line 17, cancel "Specification No. 1,143,092 (PHB 31561)",

Signed and sealed this 24th day October 1972.

(SEAL)
Attest:

EDWARD M. FLETCHER, JR.
Attesting Officer

ROBERT GOTTSCHALK
Commissioner of Patents